United States Patent
Liang et al.

(10) Patent No.: US 9,738,783 B2
(45) Date of Patent: Aug. 22, 2017

(54) CURABLE EPOXY COMPOSITIONS

(71) Applicant: Blue Cube IP LLC, Midland, MI (US)

(72) Inventors: Yi Ling Liang, Pearland, TX (US); William W. Fan, Lake Jackson, TX (US); Stanley E. Moore, Lake Jackson, TX (US); Rui Xie, Pearland, TX (US); Mark B. Wilson, Clute, TX (US)

(73) Assignee: BLUE CUBE IP LLC, Midland, MI (US)

(*) Notice: Subject to any disclaimer, the term of this patent is extended or adjusted under 35 U.S.C. 154(b) by 0 days.

(21) Appl. No.: 14/910,323

(22) PCT Filed: Sep. 16, 2014

(86) PCT No.: PCT/US2014/055888
§ 371 (c)(1),
(2) Date: Feb. 5, 2016

(87) PCT Pub. No.: WO2015/047799
PCT Pub. Date: Apr. 2, 2015

(65) Prior Publication Data
US 2016/0208091 A1    Jul. 21, 2016

Related U.S. Application Data

(60) Provisional application No. 61/882,940, filed on Sep. 26, 2013.

(51) Int. Cl.
*C08L 63/00* (2006.01)
*C08L 63/04* (2006.01)
(Continued)

(52) U.S. Cl.
CPC .............. *C08L 63/00* (2013.01); *C08G 59/08* (2013.01); *C08G 59/44* (2013.01); *C08G 59/686* (2013.01);
(Continued)

(58) Field of Classification Search
CPC ................................. C08G 59/32; C08L 63/04
See application file for complete search history.

(56) References Cited

U.S. PATENT DOCUMENTS 5,066,735 A * 11/1991 Walker et al. ....... C08G 59/066
428/416
6,210,811 B1 * 4/2001 Honda et al. .......... C08G 59/32
257/E21.503
(Continued)

FOREIGN PATENT DOCUMENTS

JP    2004-235931 A    8/2004
JP    2012-119381 A    6/2012

OTHER PUBLICATIONS

HexPly® Prepreg Technology, Hexcel Corporation, Publication No. FGU 017c, Jan. 2013.
(Continued)

*Primary Examiner* — Randy Gulakowski
*Assistant Examiner* — Ha S Nguyen

(57) ABSTRACT

Curable compositions comprising an epoxy mixture comprising a) an epoxy mixture comprising i) a first epoxy component comprising epoxy phenol novolac oligomers having a content of 2-functional monomers of less than 10 weight percent based on the total weight of the first epoxy component and having an epoxide equivalent weight in the range of 170 to 200; and ii) a second epoxy component comprising an epoxy resin having monomers with an average functionality of at least 2 and b) a hardener, are disclosed. The curable compositions can be used to prepare prepregs for hot-melt applications.

5 Claims, 1 Drawing Sheet

(51) Int. Cl.
*C08G 59/08* (2006.01)
*C08G 59/44* (2006.01)
*C08J 5/24* (2006.01)
*C08G 59/50* (2006.01)
*C08G 59/68* (2006.01)

(52) U.S. Cl.
CPC ................ *C08J 5/24* (2013.01); *C08L 63/04* (2013.01); *C08J 2363/00* (2013.01); *C08J 2363/04* (2013.01)

(56) References Cited

U.S. PATENT DOCUMENTS 7,005,185 B2    2/2006   Li et al.
2012/0285930 A1*   11/2012   Adelman et al. ....... B41C 1/045
                                                                                          216/94

OTHER PUBLICATIONS

Database WPI, Week 201415, Thomson Scientific, London, GB; AN 2013-T01776, XP002734691 & CN 103 182 831 A (Shannxi Shnegyi Sci & Technology Co Ltd), Jul. 3, 2013 (Jul. 3, 2013), Abstract.

* cited by examiner

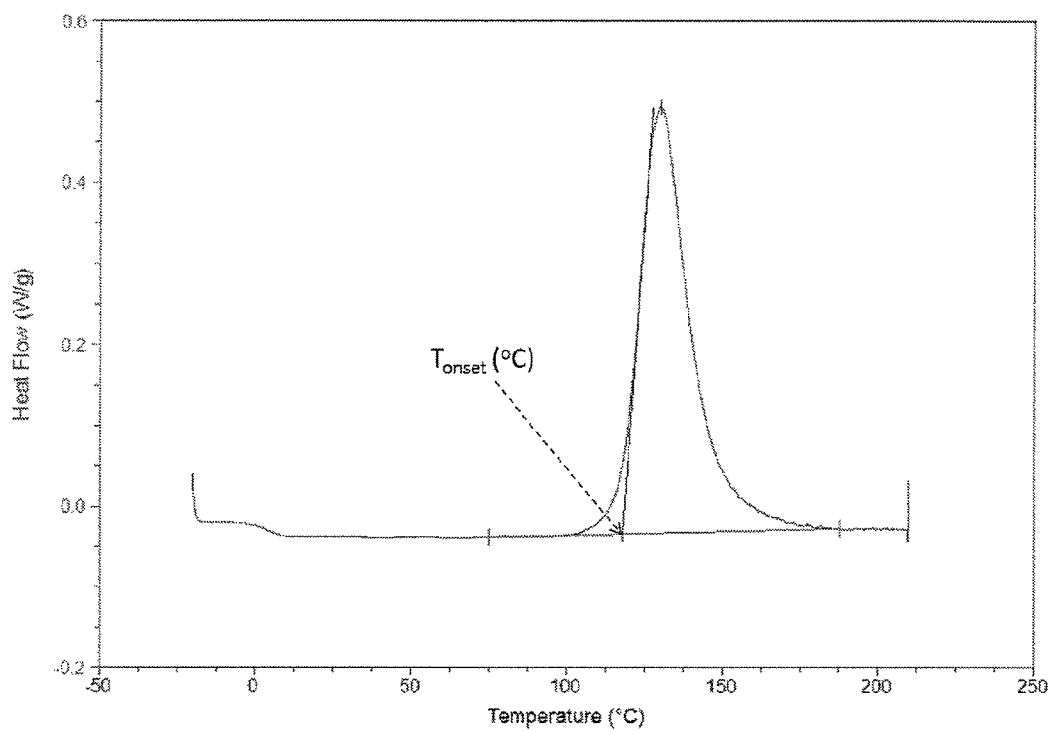

CURABLE EPOXY COMPOSITIONS

BACKGROUND OF THE INVENTION

Field of the Invention

Embodiments of the present disclosure relate to epoxy compositions and in particular to epoxy compositions that are combined with hardeners to form curable compositions. The curable compositions can be used to prepare prepregs.

Description of Background and Related Art

Epoxy thermosets have been used as the resin matrix to embed reinforced fibers to prepare lightweight and high strength composite articles for structural purposes. Among various composite manufacturing processes, the hot-melt prepreg process is a preferred process because it provides consistent properties and ease of use for composite fabricators, particularly in sporting goods, aerospace, automotive and other applications.

"Hot-melt" prepregs presented herein refer to fibers impregnated with solvent free, un-cured or slightly cured epoxy formulations. A typical manufacturing procedure involves (1) film manufacture and (2) film impregnation.

Many different types of high functional epoxy resins have been used to achieve high glass transition temperatures ($T_g$) of the cured epoxy thermosets to shorten de-molding time. However, the usage of these high functional epoxy resins may also cause a loss of adequate tackiness, and an increase in the melt viscosity of the resin blend, which can lead to insufficient resin wetting of the impregnated fibers, the formation of voids between the layered structures in composite articles, and a difficulty of preparing melt-epoxy-resin blends.

Therefore, a curable composition useful for preparing hot-melt prepregs which provides (1) adequate tack to serve as a semi-permanent adhesive (2) high glass transition temperature ($T_g$) and (3) an adequate viscosity profile for hotmelt prepreg processing is desired.

SUMMARY OF THE INVENTION

In one broad embodiment of the present invention, there is disclosed a curable composition comprising, consisting of, or consisting essentially of: a) an epoxy mixture comprising i) a first epoxy component comprising epoxy phenol novolac oligomers having a content of 2-functional monomers of less than 10 weight percent based on the total weight of the first epoxy component and having an epoxide equivalent weight in the range of 170 to 200 and ii) a second epoxy component comprising epoxy resin oligomers having monomers with an average functionality of at least 2 and b) a hardener.

BRIEF DESCRIPTION OF THE DRAWINGS

FIG. 1 is a plot of temperature versus heat flow.

DETAILED DESCRIPTION OF THE INVENTION

In various embodiments, the curable composition comprises an epoxy mixture; and b) a hardener.

Epoxy Mixture

The composition contains an epoxy mixture. The mixture comprises i) a first epoxy component comprising epoxy phenol novolac oligomers having a content of 2-functional monomers of less than 10 weight percent based on the total weight of the first epoxy component and having an epoxide equivalent weight in the range of 170 to 200 and ii) a second epoxy component comprising an epoxy resin having monomers with an average functionality of at least 2.

The first epoxy component comprises epoxy phenol novolac oligomers. In an embodiment, the epoxy phenol novolac is phenol novolac (EPN) and is a bisphenol-F epoxy novolac in yet another embodiment.

The general structure of an epoxy phenol novolac is shown in Formula I, below.

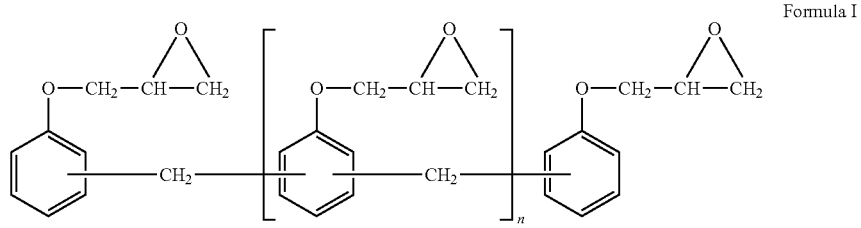

Formula I

In an embodiment, the first epoxy component comprises epoxy novolac oligomers having less than 10 weight percent of 2-functional monomers (2-functional, n=0 in Formula I, above), and has less than 5 weight percent of 2-functional monomers in another embodiment.

Generally, the first epoxy component averages in the range of from 4.0 to 5.0 epoxide groups per molecule (n=2.0 to 3.0 in Formula I above), and having an epoxide equivalent weight in the range of 150 to 220, has in the range of 4.2 to 4.8 epoxide groups per molecule (n=2.2 to 2.8 in Formula I above) and has an epoxide equivalent weight in the range of 170 to 200 in another embodiment.

The first epoxy component is generally present in the epoxy mixture in the range from 3 weight percent to 96 weight percent and is present in an amount in the range of from 10 weight percent to 90 weight percent in other embodiments, based on the total weight of the epoxy mixture. Concentrations of lower than 3 weight percent may lead to a low $T_g$ which is insufficient to reduce the de-molding time, while concentrations of higher than 96 weight percent may lead to insufficient tack performance for composite manufacturing.

In various embodiments, the epoxy mixture further comprises a second epoxy component comprising an epoxy resin having monomers with an average functionality of at least 2. In an embodiment, the second epoxy component can have an average functionality of 2.8.

The second epoxy component may vary and can include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins include, but are not limited to epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of paraaminophenols. Other examples of suitable epoxy resins include but are not limited to reaction products of epichlorohydrin with o-cresol and, respectively, phenol novolacs. Further epoxy resins include epoxides of divinylbenzene or divinylnaphthalene. It is also possible to use a mixture of two or more epoxy resins.

The epoxy resins useful in the present invention for the preparation of the curable compositions may be selected from commercially available products; for example, D.E.R.® 331, D.E.R.® 332, D.E.R.® 383, D.E.R.® 334, D.E.R.® 580, D.E.N.® 431, D.E.N.® 438, D.E.R.® 736, or D.E.R.® 732, epoxy resins available from The Dow Chemical Company or Syna 21 cycloaliphatic epoxy resin from Synasia. As an illustration of the present invention, the additional epoxy resin may be a mixture of a liquid epoxy resin, such as D.E.R. 383, an epoxy novolac D.E.N. 438, a cycloaliphatic epoxide Syna 21, and a divinylarene dioxide, divinylbenzene dioxide (DVBDO) and mixtures thereof.

The second epoxy component is generally present in the epoxy mixture in the range of from 0 weight percent to 97 weight percent, based on the total weight of the epoxy mixture, and is present in the range of from 10 weight percent to 90 weight percent, based on the total weight of the epoxy mixture in various other embodiments.

Hardener

A hardener can be added to the mixture to form a curable composition.

Any suitable epoxy hardener can be used. Examples of epoxy hardeners that can be used include, but are not limited to aliphatic amines, modified aliphatic amines, cycloaliphatic amines, modified cycloaliphatic amines, amidoamines, dicyanopolyamide, polyamide, tertiary amines, aromatic amines, anhydrides, mercaptans, cyclic amidines, isocyanates cyanate esters, and the like. Suitable hardeners include Dicyandiamide (DICY), bis(4-aminocyclohexyl) methane (AMICURE® PACM), diethylenetriamine (DETA), triethylenetetramine (TETA), aminoethylpiperazine (AEP), isophorone diamine (IPDA), 1,2-diaminocyclohexane (DACH), 4,4'-diaminodiphenylmethane (MDA), diaminodiphenylsulfone (DDS), m-phenylenediamine (MPD), diethyltoluenediamine (DETDA), meta-xylene diamine (MXDA), bis(aminomethyl cyclohexane), dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride (NMA), benzophenonetetracarboxylic dianhydride (BTDA), tetrachlorophthalic anhydride (TCPA), and the like, and mixtures thereof.

Phenolic hardeners can also be used in the thermosetting composition. Suitable phenolic hardeners include the Rezicure® 3XXX product line, Meiwa's MEH-XXXX product line or other phenolic hardeners known to those skilled in the art.

Generally, the hardener is present in the curable composition in the range of from 1 to 35 parts per hundred parts epoxy resin (phr), and from 3 to 30 phr in another embodiment. A hardener content of less than 1 phr may lead to insufficiently-cured thermosets that are not capable of providing desired composite performance Optional Components Solvents In various embodiments, the curable composition can optionally further comprise one or more solvents. Examples of solvents that can be used include, but are not limited to methyl ethyl ketone (MEK), dimethylformamide (DMF), ethyl alcohol (EtOH), propylene glycol methyl ether (PM), propylene glycol methyl ether acetate (DOWANOL™ PMA) and mixtures thereof.

In various other embodiments, no solvent is used.

Catalysts

Optionally, catalysts can be added to the curable composition to facilitate the curing of the formulation. The type of catalyst depends on the desired end use.

Examples of catalysts that can be used include, but are not limited to phenyl dimethyl urea (Omicure U405, CVC Thermoset Specialty), 4,4' methylene bis phenyl dimethyl urea (Omicure U415, CVC Thermoset Specialty), cycloaliphatic dimethyl urea (Omicure U35, CVC Thermoset Specialty), 3, 4 dichlorophenyl dimethyl urea (Diuron, CVC Thermoset Specialty), and 4 chlorophenyl diemthyl urea (Monuron, CVC Thermoset Specialty). Other catalyst examples include, but are not limited to at least one tertiary amine, including phenolic substituted ones; at least one boric acid-amine complex; at least one boron trifluoride-amine complex; at least one imidazole or substituted imidazole; at least one metal acetylacetonate); at least one transition metal (for example cobalt, nickel, zinc, chromium, iron, copper) salt; at least one quaternary ammonium or phosphonium salts; at least one phosphine or substituted phosphine compound; or a combination thereof.

Generally, the catalyst is present in the curable composition in the range of from 0.5 to 10 parts per hundred parts epoxy resin (phr), and in the range of from 1 to 8 phr in another embodiment.

Toughening Agents

The curable composition can also contain a toughening agent. In an embodiment, the toughening agent is a core shell rubber.

A core shell rubber is a polymer comprising a rubber particle core formed by a polymer comprising an elastomeric or rubbery polymer as a main ingredient, optionally having an intermediate layer formed with a monomer having two or more double bonds and coated on the core layer, and a shell layer formed by a polymer graft polymerized on the core. The shell layer partially or entirely covers the surface of the rubber particle core by graft polymerizing a monomer to the core.

Generally the rubber particle core is constituted from acrylic or methacrylic acid ester monomers or diene (conjugated diene) monomers or vinyl monomers or siloxane type monomers and combinations thereof.

The shell layer provides compatibility to the formulation and has limited swellability to facilitate mixing and dispersion of the core shell rubber particles in the resin or hardener of the current invention. In one embodiment the shell does not have reactive groups towards the epoxy resin or the hardener of the present invention. Yet in another embodiment the shell might have reactive groups towards the epoxy resin or the hardener, for example epoxide or carboxylic acid groups.

The core shell rubber may be selected from commercially available products; for example, Paraloid EXL 2650A, EXL 2655, EXL2691 A, each available from The Dow Chemical Company, or Kane Ace® MX series from Kaneka Corporation, such as MX 120, MX 125, MX 130, MX 136, MX 551, or METABLEN SX-006 available from Mitsubishi Rayon.

Polymeric Additives

Polymeric additives can also be present in the curable composition. Examples of suitable polymeric additives include, but are not limited to polyvinylformals (such as Vinylec K and Vinylec L from Chisso Corp.), polymethylmethacrylates (such as Dianal BR-73 and BR-80 from Dianal America Inc.), polyethersulfones (such as Sumika Excel 3600P and 5003P from Sumitomo Chemical Co. Ltd.), polysulfones (such as Ultrason 52010 from BASF), polyimides (such as Extem Resin VH1003 from Sabic Innovative Plastics), and polyetherimides (such as Ultem 1010 and ULTEM 1040 from Sabic Innovative Plastics).

The curable or thermosettable composition of the present invention may optionally contain one or more other additives which are useful for their intended uses. For example, the optional additives useful in the present invention composition may include, but not limited to, reactive or non-reactive diluents, stabilizers, surfactants, flow modifiers, pigments or dyes, matting agents, degassing agents, flame retardants (e.g., inorganic flame retardants, halogenated flame retardants, and non-halogenated flame retardants such as phosphorus-containing materials), curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the, formulation of the present invention may be optimized by one skilled in the art.

The curable composition can be prepared by any suitable method known to those skilled in the art, such as, for example, distillation or solvent extraction. The curable composition can then be mixed with a hardener, another epoxy resin, and any other component described above to form the curable composition in any combination or subcombination.

End Use Applications

The curable composition can be used to prepare hot-melt prepregs, where fibers are impregnated with solvent free, un-cured or slightly cured epoxy formulations. A typical manufacturing procedure involves (1) film manufacture and (2) film impregnation. In film manufacture, the epoxy resin (s) are mixed at elevated temperature (eg., from 50-150° C.) with additive(s), catalyst(s), hardener(s) and fabricated to the particular film format. The formulations are mainly in the pre-polymer state with a limited curing level (if any), and the films are protected by paper/polyethylene release sheets. In film impregnation, the woven or unidirectional fabrics are impregnated with the epoxy films under heat to form prepregs. Prior to the curing, the prepregs are somewhat similar to those sticky tapes covered with protective sheets. Once the protective sheets are removed, multiple layers or plies of the prepregs are stacked into a mold, or onto a mandrel to form the desired shapes of the composite articles. Then the prepreg materials undergo a thermal curing process under vacuum and/or pressure to consolidate the laminates. A higher curing temperature usually leads to rapid curing reaction kinetics, but may require additional mold-cooling time, which enables the consolidated laminates regain the sufficient stiffness for their removal from the hot molds.

In various embodiments, the prepregs prepared from the curable compositions have a glass transition temperature ($T_g$) that is equal to or greater than the final curing temperature when the prepreg is cured for less than two hours. In various embodiments, the curing conditions include a curing temperature in the range of from 80° C. to 200° C. In various embodiments, the $T_g$ is in the range of from 115° C. to 215° C.

Tack is the property of a semi-permanent adhesive that allows it to adhere to another surface on immediate contact. With regards to tack, the desired complex shear modulus (G*) ranges from about 0.3 MPa to 0.03 MPa under 25° C., 1 rad/s. When G* is larger than 0.3 MPa, the uncured epoxy composition may lack of adequate wetting capability to attach to the adherent. When G* is smaller than 0.03 MPa, the uncured epoxy composition may lack of adequate shear resistance to hold the prepreg on the vertical adherent.

In an embodiment, prepregs are manufactured as follows: sheets of carbon-fiber fabric pre-impregnated with somewhat sticky, solvent-free, epoxy formulations are supplied in rolls. A silicone-treated paper and/or polyethylene protective sheet is sandwiched between the layers on the roll to prevent the pre-preg from sticking to itself during storage and to facilitate handling during the fabrication process.

The acceptable impregnation temperature ranges of the hot-melt (solvent free) prepreg fabrication from about 60° C. to about 80° C., which is at least 20° C. lower than the onset temperature of the exothermic curing reaction shown in FIG. 1. Such impregnation temperature range is supposed to reduce the undesired epoxy gelation prior to the composite fabrication. The recommended processing viscosity level with the aforementioned temperature range is from about 10 to about 3 Pa*s, such that the fibers are still capable of being impregnated with the epoxy composition with a good fiber wetting, even with the presence of optional solid and viscous fillers, but without resin dripping.

Examples of uses for the composite articles that can be prepared with the hotmelt prepregs include, but are not limited to sporting goods, aircrafts, and automobiles.

EXAMPLES

The following raw materials were used:
Experimental EPN—(E-EPN), high functional epoxy phenol novolac with averages in the range of from 4.0 to 5.0 epoxide groups per molecule (n=2.0 to 3.0 in Formula I above), with less than 5 weight percent based on the of 2.0 epoxide groups per molecule (2-functional).
D.E.N.™ 438—("DEN 438"), an EPN having an average of 3.6 epoxide groups per molecule, available from the Dow Chemical Company.
D.E.N.™ 431—("DEN 431"), an EPN having an average of 2.8 epoxide groups per molecule, available from the Dow Chemical Company.
D.E.R.™ 662—("DER 662"), a solid epoxy resin available from the Dow Chemical Company.
D.E.R.™ 383—("DER 383"), a bisphenol A liquid epoxy resin available from the Dow Chemical Company.
Epon SU-8—("eBPAN"), epoxy bisphenol A novolac, a multifunctional epoxy, available from the Momentive.
CG-1200—("DICY"), dicyandiamide, a latent curing agent available from the Air Product and Chemical Inc.
U415 M—("UREA"), 2,4-toluene bis dimethyl urea, a catalyst, available from the Emerald Performance, CVC Thermoset Specialities.

In Examples 1 and 2, DEN 431 was heated to 70° C. and DICY and UREA were then added and mixed together by a SpeedMixer™ (DAC150.1 FVZ-K, FlackTeK Inc.) at 2,300 rpm for 2 min, at least three runs or more, to obtain the homogeneous blend, Blend-1. The E-EPN, DER 383 and DER 662 were heated to 120° C. and were mixed by the above SpeedMixer™ at 2,300 rpm for 2 min, at least three runs or more, to obtain the homogeneous blend, Blend-2. Blend-1 was then poured into Blend-2, and the two blends were mixed together using the above-mentioned SpeedMixer™ at 800 rpm for 30 sec, and then at 1,600 rpm for 1 min to obtain a well-mixed formulation. The whole formulation was poured into a pre-heated mold (about 120° C.) to cast the 3 mm thick plaques for further curing. The amounts of the components used in Examples 1 and 2 are shown in Tables 1 and 2, respectively.

In comparative examples A and B, DEN 431 was heated to 70° C. and DICY and UREA were then added and the components were mixed using the above-mentioned SpeedMixer™ with 2,300 rpm, 2 min, at least three runs or more, to obtain the homogeneous blend, Blend-1. DER 383 and DER 662 and epoxy bisphenol A novolac (EBPAN) (EBPAN is used in Comparative Example B only) heated to 120° C. and mixed together with the above SpeedMixer™ with 2,300 rpm, 2 min, at least three runs or more, to obtain the homogeneous blend, Blend-2. Blend-1 was then poured into the Blend-2, and the two blends were then mixed by the above SpeedMixer™ at 800 rpm for 30 sec, and then at 1,600 rpm for 1 min to obtain a well-mixed formulation. The whole formulation was poured into the pre-heated mold (about 120° C.) to cast the 3 mm thick plaques for further curing. The components were used in the amounts shown in Table 1.

In comparative example C, DEN 431 was heated to 70° C. and DICY and UREA were then added and the components were mixed using the above-mentioned SpeedMixer™ at 2,300 rpm for 2 min, at least three runs or more, to obtain the homogeneous blend, Blend-1. DEN 438 was heated to 120° C. and was mixed with Blend-1 using the above SpeedMixer™ (DAC150.1 FVZ-K, FlackTeK Inc.) at 800 rpm for 30 sec, and then at 1,600 rpm for 1 min to obtain a well-mixed formulation. The whole formulation was poured out into the pre-heated mold (about 120° C.) to cast the 3 mm thick plaques for further curing.

For Comparative Examples A and B and Example 1, the curing schedule used was 2 hours of 140° C. isotherm curing in an air circulation oven.

For Example 2 and Comparative Example C, the curing schedule used was 2 hours of 160° C. isotherm curing in an air circulation oven.

TABLE 1

|  | Comp-A | Comp-B | Ex-1 |
|---|---|---|---|
| Part A |  |  |  |
| (a1) Experimental EPN (g) | 0 | 0 | 16 |
| (a2) DEN431(g) | 19.8 | 19.8 | 19.8 |
| (a3) DER383 (g) | 32.1 | 25.7 | 25.7 |
| (a4) DER662 (g) | 48.1 | 38.5 | 38.5 |
| (a5) eBPAN (g) | 0 | 16 | 0 |
| PartB |  |  |  |
| (b1) DICY (g) | 5.6 | 5.6 | 5.6 |
| (b2) UREA (g) | 2.8 | 2.8 | 2.8 |
| $T_{onset}$ (° C.) | 118 | 117 | 118 |
| $T_g$ (° C.) 140° C. cured | 136 | 152 | 149 |
| $\eta^*$ @ 80° C. (Pa * s) | 9.2 | 11.4 | 7.4 |
| $G^*$ @ 1 rad/s (MPa) | 0.07 | 0.22 | 0.07 |
| Flexure Modulus (GPa) | 3.14 | 3.08 | 3.27 |
| $K_{IC}$ (MPa * $m^{0.5}$) | 1.02 | 0.85 | 0.85 |

TABLE 2

|  | Comp-C | Ex-2 |
|---|---|---|
| Part A |  |  |
| (a1) Experimental EPN | 0 | 80.2 |
| (a2) DEN431(g) | 19.8 | 19.8 |
| (a3) DER383 (g) | 0 | 0 |
| (a4) DER662 (g) | 0 | 0 |
| (a5) eBPAN | 0 | 0 |
| (a6) DEN438 (g) | 80.2 | 0 |
| PartB |  |  |
| DICY (g) | 5.6 | 5.6 |
| UREA (g) | 2.8 | 2.8 |
| $T_{onset}$ (° C.) | 117 | 117 |
| $T_g$ (° C.) 160° C. cured | 193 | 215 |
| $\eta^*$ @ 80° C. (Pa * s) | 1.5 | 6.4 |
| $G^*$ @ 1 rad/s (MPa) | 0.005 | 0.21 |
| Flexure Modulus (GPa) | 2.93 | 3.53 |
| $K_{IC}$ (MPa * $m^{0.5}$) | 0.58 | 0.52 |

Characterizations

The functionality was determined by the GPC using a Viscotek GP Max equipped with a TDA 302 detector array which included a refractive index detector, a viscosity detector, and a RALLS (right angle laser light scattering detector). Separation was achieved using 2 PL gel 3 um mixed E, 300×7.5 mm analytical columns. Tetrahydrofuran (THF), inhibited with 250 ppm BHT was used as the mobile phase. The sample was dissolved in mobile phase (1%) and filtered. The instrument was calibrated using Viscotek 115K polystyrene standards.

A differential scanning calorimeter (TA Instruments Q2000) was used for thermal analysis. The onset temperature of the exothermic curing reaction, $T_{onset}$, was obtained by conducting a temperature sweep of 2° C./min under nitrogen atmosphere (flow rate=80 ml/min).

The dynamic mechanical thermal analysis (DMTA) was conducted by using an advanced rheometric expansion system (ARES G2, TA Instruments). The nominal dimension of the testing specimen was 12.7 mm×3.0 mm×40.0 mm. The testing temperature ranged from 25 to 250° C. and with a ramp rate of 3° C./min. The fixed testing frequency was 1 Hz and the strain amplitude was 0.1%. The peak of tan δ was reported as the Cured $T_g$.

A rotational rheometer (AR2000 ex. TA Instruments) was used for the rheological study. The investigations were conducted by using a stainless steel parallel plate (50 mm diameter, gap=800 μm). The viscosity-temperature profile of the tested formulation was monitored with the fixed ramp rate, oscillation frequency and oscillation strain (2° C./min, 1 Hz, and 0.5%, respectively). A frequency sweep (0.1 to 100 Hz) at 25° C. was conducted to monitor the variation of the complex shear modulus for the tack measurement.

The fracture toughness ($K_{IC}$) and flexure modulus were determined by following the testing guidance of ASTM D5045 and ASTM D790, respectively.

What is claimed is:
1. A curable composition comprising:
   a) an epoxy mixture comprising
   i) a first epoxy component comprising an epoxy phenol novolac having an epoxide equivalent weight in the range of 170 to 200 and an average functionality of from 4.2 to 4.8 epoxy groups per molecule, wherein the first epoxy component comprises less than 5 weight percent of 2-functional monomers, in the range of from 15 weight percent to 20 weight percent of 3-functional monomers, in the range of from 10 weight percent to 20 weight percent of 4-functional monomers, in the range of from 10 to 20 weight percent of 5-functional monomers, and in the range of from 50weight percent to 60 weight percent of 6-functional monomers, based on the total weight of the first epoxy component; and ii) a second epoxy component comprising an epoxy resin having monomers with an average functionality of at least 2;

wherein the first epoxy is present in the range of from 10 weight percent to 90weight percent and the second epoxy is present in the range of from 10 weight percent to 90 weight percent, based on the total weight of the epoxy mixture; and b) a hardener selected from the group consisting of aliphatic amines, modified aliphatic amines, cycloaliphatic amines, modified cycloaliphatic amines, amidoamines, dicyanopolyamide, polyamide, tertiary amines and aromatic amines.

2. A curable composition in accordance with claim 1 wherein the curable composition does not contain a solvent.

3. A curable composition in accordance with claim 1 further comprising a catalyst.

4. A curable composition in accordance with claim 1 having a complex shear modulus in the range of from 0.3 MPa to 0.03 MPa at conditions of under 25° C. and 1 rad/s and a glass transition temperature ($T_g$) that is equal to or greater than the final curing temperature when cured for less than two hours.

5. A hot melt prepreg prepared from the curable composition of claim 1.

* * * * *